United States Patent Office 3,232,782
Patented Feb. 1, 1966

3,232,782
HIGH TEMPERATURE RESISTANT VITREOUS MATERIAL AND METHOD OF PRODUCING SAME
Richard F. Shannon, Lancaster, Ohio, assignor to Owens-Corning Fiberglas Corporation, a corporation of Delaware
No Drawing. Filed Aug. 5, 1960, Ser. No. 47,595
11 Claims. (Cl. 117—54)

This invention relates to a high temperature resistant vitreous material, and to a method for producing such material. More particularly, the invention relates to a vitreous material or article in the form of fibers, flakes, foam glass, or the like, which material possesses extremely good high temperature resistance and excellent strength at such high temperatures by virtue of its comprising a body or core consisting essentially of silica and a coating, adhered to at least one surface of the body or core, of a refractory metal oxide or silicate.

Fibers and flakes of a vitreous substance having a maximum dimension in at least one direction not greater than about 0.005 inch, as well as foam glass sheets having wall thicknesses btween pores not greater than about 0.1 inch have many characteristics that make them highly advantageous for various uses. Service temperature is a condition which limits the use of such fibers, flakes, and the like, which are usually made of glass. For example, glass fibers can be used to advantage in gasketing materials, pipe wraps and other insulating applications, but are unsuited for use where service conditions involve temperatures above the softening point of the glass.

Various attempts have heretofore been made to treat glass fibers, flakes, and the like, subsequent to their production, to produce treated materials effective under service conditions involving higher temperatures than the fibers or flakes themselves are capable of withstanding. One such treatment which has been found to be highly effective in upgrading the temperature resistance of glass materials involves the provision of a substantially continuous refractory metal oxide coating adhered to at least one surface of the glass material. Such a material is the subject of United States Patent 2,901,379. Articles in accordance with the above patent have been found to withstand temperatures as high as 1550° F., in a static test, without fusion, and as high as 2190° F. for eight hours in the direct flame of a Fisher burner without burning through. While a temperature resistance of the above order constitutes a significant improvement over materials produced from uncoated vitreous materials themselves, i.e., glass fibers, which are suitable for applications involving service temperatures up to only about 1000° F., various new applications have made the provision of extremely high temperature resistant insulating materials, e.g., materials capable of withstanding temperatures of 2000° F. or higher for considerable lengths of time, to be particularly desirable.

The instant invention is based upon the discovery that a fiber, flake, foam glass sheet or other similar form of a vitreous substance having a maximum dimension in at least one direction not greater than 0.1 inch, which either has been treated subsequent to its manufacture so as to consist essentially of silica or is originally formed from an essentially pure silica melt, and is thereafter provided with a coating consisting essentially of at least one of certain refractory metal oxides or silicates, provides an extremely strong, high temperature resistant material capable of withstanding temperatures above 2000° F. for substantial periods of time. More particularly, it has been found that a vitreous body consisting essentially of silica can be made into an extremely strong, high temperature resistant material by providing adhered to at least one surface of the body, a coating consisting essentially of at least one compound selected from the group consisting of the oxides and silicates of chromium, aluminum, zirconium, titanium, and metals of Group II of the Periodic Table having an atomic number of from 4 to 12, i.e., beryllium or magnesium.

It is, therefore, an object of this invention to provide an improved high temperature resistant vitreous material having a maximum dimension in at least one direction not greater than about 0.1 inch.

More particularly, it is a further object of the invention to provide an improved vitreous fiber, flake, or the like, which fiber, flake or the like consists essentially of silica and is capable, by virtue of a coating, adhered to at least one surface thereof, of a refractory metal oxide or silicate, of withstanding temperatures of the order of 2000° F. without appreciable loss of strength.

It is a still further object of the invention to provide a strong, high temperature resistant material comprising a porous, vitreous body or core consisting essentially of silica, and a coating consisting essentially of a refractory metal oxide or silicate adhered to and interspersed within the pores of the body.

Another object of the invention is to provide a method for producing an extremely strong, high temperature resistant fiber, flake or similar mass of a vitreous material.

Still another object of the invention is the provision of a method for producing a high temperature resistant material by first providing a vitreous body consisting essentially of silica and having a maximum dimension in at least one direction not greater than 0.1 inch, coating such body with an acid salt of a particular refractory metal, and thereafter converting such salt to the corresponding hydroxide or silicate.

Other objects and advantages will in part be apparent and will in part appear hereinafter.

For a better understanding of the nature and objects of the invention, reference should be had to the following detailed description which is intended only to illustrate and disclose, but in no way to limit, the invention.

According to the invention, an improved article of manufacture and method of producing same are provided. Such article comprises a vitreous body consisting essentially of silica and having a maximum dimension in at least one direction not greater than 0.1 inch, and a coating adhered to at least one surface of the body. The coating must constitute an appreciable percentage of the combined weight of the vitreous body and coating, and must consist essentially of at least one compound selected from the group consisting of the oxides and silicates of chromium, aluminum, zirconium, titanium, and metals of Group II of the Periodic Table having an atomic number from 4 to 12 for its effect upon lending strength to the body at high service temperatures to be appreciable. In this respect, it will be appreciated that fibers, flakes, or the like, consisting essentially of silica would themselves possess an extremely high melting point (e.g., cristabolite has a melting point of 3110° F.) and, therefore, offer excellent temperature resistance above 2000° F. It would appear, therefore, unnecessary further to treat such bodies in order to render them effective as satisfactory insulating materials for various high temperature applications.

However, it has been found that such substantially pure silica bodies do not alone possess sufficient strength at high temperatures of the order of 1500° F. to 2000° F. to enable their successful use in applications involving service at such temperatures. The formation of a refractory metal oxide or silicate coating, in situ, on the silica body has been found greatly to strengthen the normally weak fiber body or the like without detracting from its excellent high temperature resistance, and, therefore, to produce an extremely excellent article for service in various high temperature applications. In other words, it has been found that a unique and unexpected cooperation takes place between the essentially pure silica body and the particular refractory metal oxide or silicate coating which results in the production of a highly effective, high temperature insulating material.

The terms "parts" and "percent" as used herein and in the appended claims, refer to parts and percent by weight, unless otherwise noted.

As previously mentioned, the vitreous body or core of the article produced in accordance with the invention must consist essentially of silica. In this respect, it has been found that the vitreous body or core to be coated must consist of at least 90 percent silica and be essentially free of all fluxes and the like normally present in glass fibers and similar glass bodies. These fluxes and/or glass forming and addition ingredients include the alkali metal oxides, the alkaline earth metal oxides, boric oxide, lead oxide, iron oxide, fluorides, etc. It has been found that even relatively small amounts of these fluxes and addition agents in the glass fiber, flake, or the like composition appreciably lowers the softening or fusion point of articles otherwise produced in accordance with the invention, i.e., coated with the particular refractory metal oxides or silicates.

Although the invention is in no way to be limited by any theory, it is believed that failure of refractory metal oxide or silicate coated glass fibers at elevated temperatures, i.e., above 1600° F., or at even lower temperatures after considerable lengths of time under service conditions, is due to the migration of potassium ions, sodium ions, $B_2O_3^{--}$ and the like into the coating material, which migrated ions in turn act as fluxes and contaminate the coating and lower the over-all temperature resistance of the body. In accordance with the invention, then, it is extremely important that any of these ions be removed so that low melting mixtures are not formed due to ion migration after exposure for considerable time at high temperatures. In this respect, it should be noted that it is possible that the glass fibers themselves at the elevated temperature would be in the fluid stage, thereby making migration extremely easy.

One method which has been found to be particularly well suited for use in accordance with the instant invention for producing bodies consisting essentially of silica involves, as a first step thereof, the leaching of glass fibers, flakes or the like in a relatively strong acid solution. For example, excellent results have been obtained when the glass fibers, flakes, or the like, were first immersed in a 5 to 15 N hydrochloric acid solution heated to a temperature of approximately 95° C. for a period of time from about 30 to 120 minutes. It has been found that when glass fibers containing at least 45 percent silica were leached for approximately 30 minutes in a hot hydrochloric acid solution as mentioned above, the major portion of the various glass-forming ingredients exclusive of silica were removed and a porous glass structure containing, on the basis of wet analysis, from about 75 percent to about 90 percent of silica resulted. After completion of the leaching step, the fibers can then be fired to produce a body containing at least 90 percent of silica, determined as indicated, and free of the various fluxing metallic oxides such as calcium oxide, magnesium oxide, potassium oxide, sodium oxide and boric oxide normally present therein. In this respect, firing the leached fibers at temperatures of about 1600° F. to 1850° F. for approximately two hours has resulted in obtaining fibers containing from about 94 percent to in excess of 99.9 percent silica. The firing procedure, of course, drives off the various volatile chloride salts and the like formed in the leaching step, and additionally eliminates other glass-forming ingredients not removed or converted to chlorides by the leaching step.

The product resulting from the leaching and firing steps above described is of a spongy, porous structure due to the elimination of the various glass-forming ingredients and provides an excellent base or contacting surface for the refractory metal oxide or silicate coating which is formed in situ thereon according to the invention as will hereinafter be explained in more detail.

It should be noted that the essentially pure silica fiber, flake, foam glass sheet or the like forming the core or body of the article in accordance with the invention may be produced subsequently to the manufacture of the fiber, etc., by any other satisfactory process in addition to leaching, or, for example, may be made directly from a substantially pure silica melt. In this respect, it is only necessary that the resulting body consist essentially of silica or contain at least 90 percent of silica and is essentially free of any metal oxides or the like which, upon ion migration into, or solid phase reaction with, the subsequently applied coating would contaminate the refractory oxide or silicate coating and lower the melting temperature thereof.

As previously mentioned, the coating in accordance with the invention consists essentially of at least one compound selected from the group consisting of the oxides and silicates of chromium, titanium, aluminum, zirconium and metals of Group II of the Periodic Table having an atomic number from 4 to 12. Optimum results have been achieved where the coating comprises chromium oxide or silicate, or aluminum silicate. It is important to note that none of the above recited refractory metal oxides form, with silica, a mixture of silicates or the like having a melting point appreciably lower than silica, or at least not having a melting point lower than the temperatures which should conceivably be encountered in service of the resulting insulating materials. This is extremely important since it is very probable that some solid phase reaction and migration of the coating material into the core or silica body takes place during extended periods of time at the high service temperatures. This is especially true where porous silica bodies are employed, such as those resulting from the leaching and firing operations previously described, due to the great amount of surface contact between the coating and body which in turn increases the likelihood of interfacial migration and diffusion. Further, it is believed that a certain amount of this interfacial diffusion is actually desirable in that it appears to promote to some extent the reinforcement effect of the refractory metal oxide or silicate coating on the essentially pure silica body or core. In this same respect, it is even possible, assuming an extremely large surface contact area, that the coated vitreous fibers, flakes or the like, after a relatively long time at high temperatures, completely become, in essence, a mass of various silicates formed by reaction between the refractory metal oxides and silica. These materials, formed in situ at the high service temperatures, would, of course, present a strong high temperature resistant structure.

Significant raising of the strength properties of the silica bodies at high temperatures has been achieved by virtue of a refractory metal oxide or silicate coating thereon constituting as little as 3 percent of the combined weight of the refractory oxide or silicate coating and the silica body. So far as is known, there is no upper limit on the thickness or weight percentage of refractory metal oxide or silicate coating that can be used, apart from substantially purely physical and economic considerations. For example, an extremely thick coating, i.e., constituting over about 90 percent of the weight of coating and silica body, would completely change the physical characteristics of the silica fibers, flakes, or the like carrying such coating, and the resulting article would assume for the most part the characteristics of the coating, rather than those of the silica body. In such instances, the article, although still possessing adequate high temperature resistance would not exhibit the exceptional highly desirous strengths obtained with somewhat lower coating percentages.

In the majority of instances, there is no reason for the refractory metal oxide or silicate coating to constitute more than about 50 percent of the combined weight of the silica body and coating, since little or no corresponding increase in strength is obtained with the use of such large quantities and, further, no increase in temperature resistance would result. However, higher percentages of a magnesium oxide, zirconium oxide or aluminum oxide coating may be employed if exceptionally high temperature resistance is desired since high refractory metal oxide content mixtures of such oxides and silica have a melting point higher than silica alone. For example, mixtures of magnesium oxide and silica containing over about 57 percent of magnesium oxide have a melting temperature of about 3362° F.; mixtures of zirconium oxide and silica containing over about 66 percent zirconium oxides have a melting temperature of about 3225° F.; and mixtures of aluminum oxide and silica containing over about 72 percent aluminum oxide have a melting temperature of about 3290° F. In general, however, optimum results have been obtained, when taking temperature resistance, strength, and economic factors into consideration, where the coating constituted from about 5 percent to about 25 percent of the total weight of coating and silica body.

The fiber, flake, foam glass sheet or the like consisting essentially of silica and having a maximum dimension in at least one direction not greater than about 0.1 inch may be provided with a coating in accordance with the invention by merely applying a suitable solution of a salt of one of the previously named refractory metals to the bodies, and thereafter converting the salt to the corresponding oxide or silicate. In the case of a refractory metal oxide coating, such conversion can be accomplished merely by heating. For example, a salt which is converted to the corresponding oxide by heat, such as aluminum sulphate, magnesium chloride, titanium oxysulphate ($TiOSO_4$), zirconium chloride, chromium chloride, beryllium chloride or the like can be applied to the silica bodies, and the resulting bodies dried. The dried coated bodies are strong and resistant to temperatures above 2000° F. without loss of strength if the metal salt is present in sufficient amount to produce a refractory metal oxide coating constituting at least about 3 percent of the combined weight of the silica body and coating. It is believed that, in this instance, the metal salt is converted, by heat, to the refractory metal oxide which then reinforces the silica body so as to enable its use in various high temperature materials without at the same time lowering the temperature resistance of the substantially pure silica body to any appreciable extent. It should be noted that in such case it is not necessary to subject the coated article to a high temperature in order to produce the refractory metal oxide coating, as the fiber or the like can merely be fabricated into a finished article such as pipe wrap or a high temperature gasket, and the final conversion of the metal salt coating to a refractory metal oxide coating need never occur if the particular product is never subjected to a sufficiently high service temperature for the conversion. The refractory metal salt coating is capable of such conversion at any time. In other words, conversion need not take place until that time when the silica body itself is weakened to an appreciable extent by the high temperature, and it is at this point at which conversion will occur.

Although, as mentioned above, articles in accordance with the invention comprising a refractory metal oxide coating may be produced by coating a silica body with a refractory metal salt which is convertible to the corresponding oxide merely by heating, a preferred method of producing both the refractory metal oxide coating and the refractory metal silicate coating involves gelling the refractory metal in situ on the silica body as a silicate or hydroxide thereof. If appears that a better bond between the final refractory metal oxide or silicate coating and the silica body is obtained where such a gel is formed.

One method which has been found to be particularly satisfactory for producing a gelatinous coating of the desired refractory metal oxide or silicate on the silica body includes first treating or contacting the body with an acid salt of the particular desired refractory metal, for example, by immersing the body into a solution of such salt, and thereafter treating the resulting material again, for example, by immersion, and while still wet, with either a hydroxide solution, preferably an ammonium hydroxide solution, or a silicic acid solution. This results in the formation of a gelatinous coating of the particular refractory metal hydroxide or silicate. The hydroxide is convertible to the oxide merely by heating. The desired weight percentage of the coating material is, of course, essentially obtained by varying the concentrations of the solutions and the time of immersion. Although good results with regard to high strength and temperature resistance have been obtained when employing refractory metal sulfates, chlorides and the like as above described, optimum results have been obtained where the refractory metal salt employed was a salt of a weak acid, for example, a refractory metal oxalate, formate, lactate, acetate or the like. Further, it is preferred that the salt be water soluble to an extent which enables a satisfactory water solution of same to be prepared and used due to relative ease of preparation and the favorable economic advantage which is obtained. The following are examples of such salts: aluminum acetate and aluminum lactate; beryllium oxalate; chromium acetate and chromium oxalate; magnesium acetate, formate and lactate; titanium oxalate; and zirconium acetate. It is believed that the use of such weak acid salts is particularly desirable since the possibility of the formation of a strong acid upon the subsequent immersion in either silicic acid or ammonium hydroxide, and the ill effects on the resulting article which the formation of such a strong acid could possibly exert if the application thereof required relatively long periods at high temperatures, is obviated. In this same respect, it has been found to be advantageous to dry the coated silica body after contact with either the silicic acid or the ammonium hydroxide at a temperature just slightly above the decomposition temperature of the acid by-product formed, for example, when employing an acetate, at a temperature of about 125° C. (the boiling point of acetic acid being 118.1° C.)

Although immersing or merely dipping a mass of the silica fibers or the like into a solution of the refractory metal salt and then into the ammonium hydroxide or silicic acid solution is a preferred method of contacting the fibers with the solution due to the ease and simplicity thereof, it will be apparent that any other suitable method may be employed. For example, the fibers may be sprayed with the solutions, or the solutions may even be applied thereto by painting or swabbing. After the solutions have been applied to the fibers and the silicate or hydroxide formed in situ thereon, and any acid by-product driven off, the coated fibers may then be fired at extremely high temperatures without any major loss in strength.

The following examples constitute the best presently known mode for practicing the instant invention.

Example 1

A glass fiber tape 72 inches long, 1.5 inches wide, and 0.015 inch thick was subjected to a leaching treatment by immersion in a 5 N HCl solution maintained at 95° C. After two immersion periods of 60 minutes each in the leaching solution, the tape was removed therefrom, rinsed in distilled water and an analysis run thereon to determine the silica content of the leached tape. The analysis revealed the leached tape to contain 85 percent $SiO_2$.

The leached tape was then fired at a temperature of 1600° F. for two hours, cooled, and again tested for silica content. The test revealed the tape to contain in excess of 99.9 percent silica. The tape was then weighed and the weight recorded.

The leached and fired tape was next quickly dipped into at 10 percent solution of chromium acetate in water and removed therefrom. The time of immersion in the chromoum acetate solution was approximately 1 second. Immediately thereafter the chromium acetate treated tape was dipped in a 30 percent solution of silicic acid, removed from the solution, and the excess solution allowed to drain off. Again, the immersion time of the tape in the solution was approximately 1 second.

The resulting impregnated glass fiber tape was dried at a temperature of 125° C. to volatilize and drive off the acetic acid by-product. The tape was then weighed, and the weight of the tape prior to the chromium acetate and silicic acid treatments subtracted therefrom. The gain in weight of the dried tape after treatment with chromium acetate and silicic acid, divided by the weight of the tape after such treatment and drying was considered to be the weight fraction of the chromium silicate coating. The coating was found to be 16.6 percent of the chromium silicate and tape.

The tape was next placed in a furnace and fired for 1 hour at a temperature of 2150° F. After the firing, the tape was removed from the furnace, allowed to cool to room temperature, and then tested in an effort to determine the effect of the high temperature thereon and the strength retention after such high temperature firing. Visual inspection of the fired tape showed no noticeable physical damage or shrinkage.

The tape was then subjected to a rigid physical test consisting of repeatedly manually bending and flexing the tape and attempting to tear the same. Observation after severe repeated bending showed that substantially all of the fibers maintained essentially their original identity (were not fused together) and, although a small portion of the fibers had become brittle and split to some extent upon bending, still the structure itself as a whole remained together and unfused.

The tape was woven from yarn made by plying 5 rovings each of which comprised 4 single strands twisted together, each of such strands in turn comprising 204 fibers having diameters of from 0.00015 to 0.00020 inch. Such yarn was used for both the warp and fill. The glass composition of the fibers was 52.9 percent $SiO_2$, 13.8 percent $Al_2O_3$, 21.2 percent CaO, 9.1 percent $B_2O_3$, 0.6 percent $TiO_2$, 0.5 percent $Na_2O+K_2O$, 0.3 percent $Fe_2O_3$, 1.4 percent $F_2$, and traces of MgO and of MnO.

Example 2

Another tape, essentially identical with the untreated tape described in Example 1, was subjected to a leaching treatment by immersion in a 5 N HCl solution maintained at 95° C. After two immersion periods of 60 minutes each in the leaching solution, the tape was removed therefrom, rinsed in distilled water, and analyzed for silica content. The analysis revealed the leached tape to contain approximately 85 percent of $SiO_2$.

The leached tape was then fired at a temperature of 1600° F. for two hours, cooled, and again tested for silica content. The test revealed the leached and fired tape to contain in excess of 99.9 percent silica. The tape was then weighed and the weight recorded.

The leached and fired tape was next quickly dipped into a 10 percent by weight solution of chromium acetate in water and removed therefrom. The time of immersion in the chromium acetate solution was approximately 1 second. Immediately thereafter the chromium acetate treated tape was dipped in a 50 percent by weight solution of ammonium hydroxide, removed from the solution, and the excess solution allowed to drain off. Again the immersion time of the tape in the solution was approximately 1 second.

The resulting impregnated glass fiber tape was dried at a temperature of 125° C. to volatilize and drive off the acetic acid by-product. The tape was then weighed and the weight of the coating or chromium hydroxide determined to be 9.2 percent of the total weight of tape and coating. Calculated as the oxide, the coating was determined to comprise 6.8 percent of the total weight of tape and coating.

The coated tape was next placed in a furnace and fired for 1 hour at a temperature of 2150° F. After the firing, the tape was removed from the furnace, allowed to cool to room temperature, and then observed and tested as described in Example 1. Visual inspection of the fired tape showed no noticeable physical damage or shrinkage. Observation of tape after repeated bending showed, as with the tape of Example 1, that substantially all of the fibers essentially maintained their original identity and that the tape as a whole remained together and unfused.

A plurality of glass fiber tapes were then formed, leached, and fired in the same manner as described in Examples 1 and 2. All of the resulting tapes were determined to be comprised of fibers consisting in excess of 99.9 percent of $SiO_2$. Each of the tapes was then immersed in a 10 percent solution of an acid salt of a refractory metal in accordance with the invention, and thereafter immersed in a 50 percent ammonium hydroxide solution. All of the resulting tapes were then fired at 2150° F. for one hour and were tested for refractoriness and strength in the manner described in Example 1, and then rated or graded according to visual observation of their reaction to the bending test and their resistance to tear. The rating given each sample was determined in the following manner. A sample was given a rating of 1 in the event there was extremely little or no brittleness and splitting of the fibers observed during the bending test, no noticeable fusion between fibers and with the tape possessing a high resistance to tear. A rating of 2 was given to samples in which the fibers still maintained their identity but lost some amount of flexibility, i.e., tended to break and split to some extent upon bending and flexing of the tape, and which possessed a fairly good tear resistance. Tapes having a low resistance to tear and in which the fibers were very friable with little or no flexibility, and with some dusting occurring upon bending, but still substantially maintaining their original identity were given a rating of 3. Samples in which substantially all the fibers disintegrated into dust upon bending but still maintained some resemblance to a fiber even on dusting (long needle-like or acicular appearance) were given a rating of 4. A rating of 5 was given when the sample appeared to have been completely fused, dusted upon bending and there was no resemblance to any fibrous structure in the resulting dust. Plus or minus ratings were assigned to those samples which were close in appearance and tear resistance to the definition of the principal rating, but either somewhat better or somewhat worse, respectively. The results of these tests are tabulated in the following Table I.

TABLE I

| Tape No. | Leaching time (minutes) | Salt impregnant | Conversion media | Coating composition | Coating percent (based on total weight of glass and coating)[1] | Test rating |
|---|---|---|---|---|---|---|
| 1 [2] | 120 | Chromium acetate | Silicic acid | Chromium silicate | 16.6 | 1 |
| 2 [3] | 120 | ....do.... | Ammonium hydroxide | Chromium hydroxide | 6.8 | 1 |
| 3 | 120 | Magnesium acetate | ....do.... | Magnesium hydroxide | 5.8 | 2+ |
| 4 | 120 | Magnesium sulfate | ....do.... | ....do.... | 5.3 | 2 |
| 5 | 120 | Aluminum acetate | ....do.... | Aluminum hydroxide | 5.5 | 2+ |
| 6 | 120 | Aluminum sulfate | ....do.... | ....do.... | 4.7 | 2+ |
| 7 | 120 | Chromium Sulfate | ....do.... | Chromium hydroxide | 6.0 | 1 |
| 8 | 120 | Zirconium sulfate | ....do.... | Zirconium hydroxide | 8.3 | 2– |
| 9 | 120 | Zirconium Acetate | ....do.... | ....do.... | 6.7 | 2 |
| 10 | 120 | Titanium sulfate | ....do.... | Titanium hydroxide | 4.6 | 2+ |

[1] The weight of coating was calculated as the oxide in the instance where the conversion medium was ammonium hydroxide, and as the silicate where the conversion medium was silicic acid.
[2] Example 1 tape.
[3] Example 2 tape.

For purposes of comparison, but not in accordance with the invention, a tape, composed of the same composition glass fibers and formed and treated in the identical manner of Example 1 except that no leaching and firing step was included in the treatment, was prepared. This tape was then tested by subjecting it to a one hour firing time at 2150° F. Examination of the tape after the firing at 2150° F. showed that it had fused, and, when subjected to repeated bending, crumpled into dust. This tape was given a rating of 5.

Again for purposes of comparison, but not in accordance with the invention, two tapes, composed of the same composition glass fibers and formed, leached and fired in the identical manner of Examples 1 and 2 were prepared. One of the leached and fired tapes was then treated by immersion first in a 10 percent calcium chloride solution and then in 50 percent ammonium hydroxide solution. The other leached and fired tape was treated by immersion first in a 10 percent calcium acetate solution and then in a 50 percent ammonium hydroxide solution. Both tapes were then tested for refractoriness and high temperature strength by subjecting them to a one hour firing at 2150° F. Examination of the tapes after the firing at 2150° F. showed that both had become fused, and, when rubbed between two fingers, disintegrated completely into dust. Both tapes were given a rating of 5. Tapes of unleached fibers of the same composition fused completely when heated at 2150° F. for one hour and tapes of leached fibers which were otherwise untreated disintegrated substantially and dusted, being rated 4.

*Example 3*

Glass fibers averaging three-quarters of a micron in diameter and of varying lengths up to about 2 inches were subjected to a leaching treatment by immersion in a 15 N HCl solution maintained at 95° C. The composition of the fibers prior to leaching was the same as recited in Example 1. After an immersion time of 30 minutes in the leaching solution, the fibers were removed, rinsed in distilled water, and analyzed for silica content. The analysis revealed the leached fibers to contain approximately 84 percent $SiO_2$.

The leached fibers were then fired at a temperature of 1750° F. for 2 hours, cooled, and again tested for silica content. The test revealed the fired fibers to contain approximately 94.8 percent silica.

The leached and fired fibers were next formed into a paper by standard techniques in commercial paper making apparatus. The paper was made by pulping a slurry of the fibers into lengths of about 1/100 of an inch in a 10 percent by weight solution of chromium sulfate in water. A sample sheet of the paper containing 28.5 grams of fibers was placed on a screen and a 50 percent by weight solution of ammonium hydroxide was poured over the sheet and allowed to drain through the screen.

The resulting impregnated glass fiber paper was dried and then weighed. As in Example 1, the gain in weight of the dried sample after treatment with the chromium sulfate and ammonium hydroxide, divided by the weight of the fibers after such treatment and drying, was considered to be the weight fraction of the chromium hydroxide coating. In the instant example, the weight of the coating was found to be 15.4 grams, whereby the sheet carried 35.1 percent of chromium hydroxide by weight. Calculated as the oxide, the coating was determined to comprise 28.6 percent of the total weight of paper and coating.

The sheet was then trimmed into a rectangle approximately 1 inch by 3 inches, placed on end on a slab of firebrick, and supported in this position by two small pieces of firebrick placed on either side along the bottom of the paper so that the sample extended upwardly beyond the pieces. The slab and paper sample supported thereon were then placed in a muffle furnace heated to 2200° F. Visual inspection of the sample in the furnace after one hour, four hours, and eight hours at 2200° F. showed no slumping or other physical change. The furnace temperature was then raised to 2400° F. and the sample was again observed after one hour, four hours, and eight hours at this temperature. No change was noted in the physical appearance of the sample. After eight hours at 2400° F., the temperature of the muffle furnace was raised to 2600° F. Observations made after one hour, four hours, and eight hours at 2600° F. showed no noticeable change in the sample. After completion of the test of eight hours at 2600° F., the firebrick slab was removed from the furnace, and the sample allowed to cool to room temperature.

The cooled sample was then subjected to the bending and flexure test described in Example 1. Observation of the sample after severe repeated bending showed that substantially all the fibers maintained essentially their original identity, and, although a portion of the fibers had become brittle and split to some extent upon bending, still the structure itself as a whole remained together and unfused.

Another portion of the treated glass fiber paper sheet was placed in a muffle furnace heated to a temperature of 2200° F. After a period of 114 hours in the muffle furnace at a temperature of 2200° F., the paper was removed and subjected to a visual inspection for fusion or other physical change or damage. No shrinkage or fusion of the paper was detected.

Numerous papers have been formed in the manner described in Example 3, but by using varying concentrations of the refractory salt impregnant and varying concentrations of either ammonium hydroxide or silicic acid in order to obtain a wide range of coating percentages in the papers. The leaching time of the fibers was also varied; however, all the leached fibers contained over 90 percent of silica. Samples of all of the papers were then subjected to the increasing temperature test as described in Example 3 and were rated or graded according to visual observation of their reaction to the bending test after completion of the eight hour heating at 2600° F. The basis of the ratings was the same as previously described in connection with Examples 1 and 2. The results of these tests are set forth in the following Table II.

The coated foamed sheet was next placed in a furnace and fired for 2 hours at a temperature of 2150° F. After

TABLE II

| Paper No. | Leaching time (minutes) | Salt impregnant | Conversion media | Coating composition | Coating percent (based on total weight of glass and coating)[1] | Test rating |
|---|---|---|---|---|---|---|
| 1[2] | 75 | Chromium sulfate | Silicic acid | Chromium silicate | 69.3 | 1– |
| 2 | 30 | ----do---- | Ammonium hydroxide | Chromium hydroxide | 28.6 | 1 |
| 3 | 30 | ----do---- | Silicic acid | Chromium silicate | 63.0 | 2 |
| 4 | 60 | ----do---- | ----do---- | ----do---- | 64.4 | 2 |
| 5 | 60 | ----do---- | Ammonium hydroxide | Chromium hydroxide | 56.3 | 2– |
| 6 | 75 | ----do---- | ----do---- | ----do---- | 18.0 | 1– |
| 7 | 105 | ----do---- | ----do---- | ----do---- | 18.5 | 1– |
| 8 | 120 | ----do---- | Silicic acid | Chromium silicate | 25 | 2 |
| 9 | 120 | ----do---- | ----do---- | ----do---- | 31.4 | 2 |
| 10 | 120 | ----do---- | ----do---- | ----do---- | 33.5 | 2– |
| 11 | 120 | ----do---- | Ammonium hydroxide | Chromium hydroxide | 10.8 | 1 |
| 12 | 120 | ----do---- | ----do---- | ----do---- | 15.1 | 2+ |
| 13 | 120 | ----do---- | ----do---- | ----do---- | 66.6 | 2+ |
| 14 | 120 | Aluminum chloride | Silicic acid | Aluminum silicate | 42.9 | 2+ |
| 15 | 120 | No treatment | | | 0.0 | 5 |
| 16 | 120 | ----do---- | | | 0.0 | 5 |

[1] The weight of coating was calculated as the oxide where the conversion medium was ammonium hydroxide, and as the silicate where the conversion medium was silicic acid.
[2] Example 3 Paper.

It should be noted that materials or papers in accordance with the invention also may be produced by following the same procedure as described in Example 3 except that the gelling or conversion media is incorporated into the slurry itself, i.e., the paper is produced by pulping a slurry comprising the silica fibers or flakes, water, an acid salt of the particular desired refractory metal and either silicic acid or a hydroxide, e.g. ammonium hydroxide.

Example 4

A sheet of foam glass having an apparent density of about 13.6 pounds per cubic foot was subjected to a leaching treatment by immersion in a 5 N HCl solution maintained at 95° C. The foam glass sheet was produced from a batch consisting of 100 parts of powdered glass substantially all of which was a minus 325 mesh and having the same composition as the glass recited in Example 1, 3 parts of barium sulfate, 1.5 parts of calcium sulfate and 1.5 parts of aluminum in the following manner. A layer of the above batch approximately 0.5 inch in thickness was placed in a shallow mold and preheated to 1650° F. whereupon the batch-containing mold was placed in a furnace heated to 1950° F. After a heating period of approximately 10 minutes at 1950° F., the mold was removed from the furnace, allowed to cool to room temperature and the foam glass sheet which had been produced was lifted therefrom. The sheet was then annealed at a temperature of about 1000° F. for approximately two hours. Inspection of the sheet showed it to be comprised of a fine, substantially uniform cellular structure with the wall thickness between cells ranging between approximately 0.001 and about 0.01 inch.

After an immersion period of two hours in the leaching solution, the foamed glass sheet was removed therefrom and an analysis run on the leached sheet to determine the silica content thereof. The analysis revealed the leached sheet to contain 95 percent $SiO_2$.

The leached, foamed glass sheet was next dipped into a 10 percent solution of chromium acetate in water and removed therefrom after an immersion time of approximately 5 seconds. Immediately thereafter the chromium acetate treated sheet was dipped in a 50 percent solution of ammonium hydroxide, removed from the solution, and the excess solution allowed to drain off. Again the immersion time of the sheet in the solution was approximately 5 seconds.

The resulting impregnated foamed glass sheet was dried at a temperature of approximately 125° C. The coating constituted about 15 percent of the total weight of foamed glass and coating, the coating being calculated a chromium oxide.

The coated foamed sheet was next placed in a furnace and fired for 2 hours at a temperature of 2150° F. After the firing, the sheet was removed from the furnace and allowed to cool to room temperature. Visual inspection of the treated fired sheet showed no noticeable physical damage, fusion or shrinkage.

One area in which the employment of the coated silica materials in accordance with the invention would prove especially advantageous is in linings for internal combustion engine mufflers, e.g., automobile mufflers. In this respect, the materials would not only provide more than adequate temperature resistance, the temperature of the combustion gases normally not exceeding 1000° F. to 1200° F. but additionally and most importantly, would present a lining or surface which is highly resistant to the corrosive atmospheres and condensation products passing through and formed in the muffler due to the fact that such materials are essentially insoluble in acids. This additional important property possessed by the materials in accordance with the invention, of course, further adds to the desirability of their use in numerous other applications which involve service at extremely high temperatures and corrosive environments.

It will now be apparent that an extremely effective high temperature resistant article, possessing excellent strength characteristics at high service temperatures, as well as a novel method of producing such articles, is provided by the present invention. It is to be understood that the present invention is not to be construed as based upon or dependent upon the various theories and hypotheses which have been expressed herein. Further, while the more advantageous embodiments of the invention have been described, it is apparent that modifications and variations can be made in the compositions and specific procedures discussed without departing from the spirit and scope of the present invention, as those skilled in the art will readily understand.

Such modifications and variations are considered to be within the purview and scope of the invention as defined by the appended claims.

I claim:

1. An article of manufacture comprising a vitreous body consisting essentially of silica substantially devoid of fluxing metal oxides and having a maximum dimension in at least one direction not greater than 0.1 inch, and a substantially continuous coating formed in situ on the surfaces of said silica and consisting essentially of at least one compound selected from the group consisting of the oxides, hydroxides, and silicates of chromium, aluminum, zirconium, titanium, beryllium and magnesium in direct contact with the silica, said coating constituting at least 3 percent of the weight of the vitreous body and coating.

2. An article of manufacture comprising a fiber having a maximum thickness not greater than 0.005 inch, and consisting essentially of silica substantially devoid of fluxing metal oxides, and a coating formed in situ on the surfaces of said silica and consisting essentially of at least one compound selected from the group consisting of the oxides, hydroxides, and silicates of chromium, aluminum, zirconium, titanium, beryllium and magnesium in direct contact with the silica, said coating constituting at least 3 percent of the weight of the fiber and coating.

3. An article of manufacture comprising a flake consisting essentially of silica substantially devoid of fluxing metal oxides and having a maximum thickness not greater than 0.005 inch, and a coating formed in situ on the surfaces of said silica and consisting essentially of at least one compound selected from the group consisting of the oxides, hydroxides, and silicates of chromium, aluminum, zirconium, titanium, beryllium and magnesium in direct contact with the silica, said coating constituting at least 3 percent of the weight of the flake and coating.

4. An article of manufacture comprising a foamed body consisting essentially of silica substantially devoid of fluxing metal oxides and having a maximum wall thickness between pores not greater than about 0.1 inch, and a coating formed in situ on the surfaces of said silica and consisting essentially of at least one compound selected from the group consisting of the oxides, hydroxides, and silicates of chromium, aluminum, zirconium, titanium, beryllium and magnesium in direct contact with the silica, said coating constituting at least 3 percent of the weight of the foamed body and coating.

5. In a method for producing a high temperature resistant material, the steps comprising coating a vitreous body consisting essentially of silica substantially devoid of fluxing metal oxides and having a maximum dimension in at least one direction not greater than 0.1 inch with a solution of at least one compound selected from the group consisting of compounds of chromium, aluminum, zirconium, titanium, beryllium and magnesium, and converting the coating to a compound selected from the group consisting of the oxides, hydroxides, and silicates of said metals in intimate contact with the silica, said coating constituting at least 3 percent of the weight of the vitreous body and coating.

6. In a method for producing a high temperature resistant material, the steps comprising leaching a glass body containing at least 45 percent of silica, balance other various glass-forming ingredients, for a time sufficient to remove a major portion of said glass-forming ingredients and to form a porous vitreous structure containing at least 75 percent of silica and substantially devoid of fluxing metal oxides, firing said porous vitreous structure to eliminate volatiles and other glass-forming ingredients not removed by the leaching step at a temperature and for a sufficient time to produce a body containing at least 90 percent of silica, immersing said leached and fired body in a solution of at least one acid salt of a metal selected from the group consisting of chromium, aluminum, zirconium, titanium, beryllium and magnesium, and thereafter immersing said body in a silicic acid solution whereby a coating constituting at least 3 percent of the weight of the body and coating and comprising at least one silicate of the metal selected from the said group is formed in situ on the surface and within the pores of said body.

7. In a method for producing a high temperature resistant material, the steps comprising coating a vitreous body consisting essentially of silica and substantially devoid of fluxing metal oxides and having a maximum dimension in at least one direction not greater than 0.1 inch with a solution of at least one salt selected from the group consisting of the salts of chromium, aluminum, zirconium, titanium, beryllium and magnesium, treating the resulting coating with a solution selected from the group consisting of silicic acid and ammonium hydroxide to convert said coating to one constituting at least 3 percent of the weight of the vitreous body and coating and to one selected from the group consisting of oxides, hydroxides, and silicates of the metal of said first mentioned group, and formed in situ on the said vitreous body.

8. In a method for producing a high temperature resistant material, the steps comprising leaching a glass body having a maximum thickness in at least one direction not greater than 0.1 inch, and containing at least 45 percent of silica, balance other various glass-forming ingredients, for a time sufficient to remove a major portion of said glass-forming ingredients and to form a porous vitreous structure containing at least 75 percent of silica, firing said porous vitreous structure to eliminate volatile and other glass-forming ingredients not removed by the leaching step at a temperature and for a sufficient time to produce a body containing at least 90 percent of silica and substantially devoid of fluxing metal oxides, immersing said leached and fired body in a solution of at least one acid salt of a metal selected from a group consisting of chromium, aluminum, zirconium, titanium, beryllium and magnesium, and thereafter immersing said body in a hydroxide solution whereby a coating constituting at least 3 percent of the weight of the body and coating and comprising at least one hydroxide of the metal selected from the said group is formed in situ on the surface and within the pores of said body.

9. A method in accordance with claim 8 and additionally including the step of heating the coated body to a temperature sufficient to convert the said metal hydroxide to the corresponding metal oxide.

10. A method in accordance with claim 8 in which said hydroxide solution is ammonium hydroxide.

11. A method for producing a high temperature resistant material comprising the steps of leaching a glass body containing at least 45 percent of silica, balance other various glass-forming ingredients, for a time sufficient to remove a major portion of said glass-forming ingredients and to form a porous vitreous structure containing at least 75 percent of silica, and substantially free of fluxing metal oxides, firing said porous vitreous structure to eliminate volatiles and other glass-forming ingredients not removed by the leaching step at a temperature and for a sufficient time to produce a body containing at least 90 percent of silica, and coating and impregnating said body with a solution of at least one compound of a metal selected from the group consisting of chromium, aluminum, zirconium, titanium, beryllium and magnesium, and forming a uniform coating in situ consisting essentially of a material from the group consisting of hydroxides, oxides and silicates of the metal of said solution, said coating constituting at least 3 percent of the weight of the body and coating.

References Cited by the Examiner

UNITED STATES PATENTS

| | | | |
|---|---|---|---|
| 2,303,756 | 12/1942 | Nordberg et al. | 117—54 X |
| 2,355,746 | 8/1944 | Nordberg et al. | 117—54 |
| 2,639,247 | 5/1955 | Squier | 117—126 |
| 2,839,424 | 6/1958 | Labino | 117—54 |
| 2,860,951 | 11/1958 | Cunningham | 23—110 |
| 2,901,379 | 8/1959 | Shannon et al. | 117—125 X |
| 3,017,318 | 1/1962 | Labino et al. | 117—126 |
| 3,092,531 | 6/1963 | Labino | 65—31 |
| 3,113,008 | 12/1963 | Elmer | 65—31 |

OTHER REFERENCES

Mellor, "Comprehensive Treatise on Inorganic and Theoretical Chemistry," (1925), Longmans, Green and Co., vol. 6, pp. 293, 297, 314.

RICHARD D. NEVIUS, *Primary Examiner*.